United States Patent
McIntyre et al.

(10) Patent No.: US 7,206,480 B2
(45) Date of Patent: Apr. 17, 2007

(54) METHOD OF FORMING INTERLAYER CONNECTIONS IN INTEGRATED OPTICAL CIRCUITS, AND DEVICES FORMED USING SAME

(75) Inventors: Thomas J. McIntyre, Nokesville, VA (US); John C. Rodgers, Fairfax, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 246 days.

(21) Appl. No.: 10/633,071

(22) Filed: Aug. 1, 2003

(65) Prior Publication Data

US 2005/0025408 A1    Feb. 3, 2005

(51) Int. Cl.
G02B 6/26 (2006.01)
G02B 6/42 (2006.01)
C03B 37/022 (2006.01)
C03C 25/00 (2006.01)

(52) U.S. Cl. .................... 385/50; 385/15; 385/31; 385/39; 385/129; 385/130; 385/131; 385/132; 65/386; 65/403; 65/473

(58) Field of Classification Search ............ 385/14–15, 385/27–32, 45, 49–50, 123–132, 141–146; 264/1.24–1.27; 438/29, 31; 65/386, 403, 65/473
See application file for complete search history.

(56) References Cited

U.S. PATENT DOCUMENTS

| | | | | |
|---|---|---|---|---|
| 3,920,314 A | * | 11/1975 | Yajima | 385/9 |
| 3,948,583 A | * | 4/1976 | Tien | 385/14 |
| 3,992,079 A | * | 11/1976 | Giallorenzi | 385/30 |
| 4,372,641 A | * | 2/1983 | Johnson et al. | 385/140 |
| 4,568,960 A | * | 2/1986 | Petroff et al. | 257/458 |
| 5,124,543 A | * | 6/1992 | Kawashima | 250/208.1 |
| 5,198,008 A | * | 3/1993 | Thomas | 65/386 |
| 5,210,801 A | * | 5/1993 | Fournier et al. | 385/14 |
| 5,568,579 A | * | 10/1996 | Okaniwa | 385/43 |
| 5,673,284 A | * | 9/1997 | Congdon et al. | 372/50.1 |
| 6,491,447 B2 | | 12/2002 | Aihara | 6/92 |
| 2001/0026669 A1 | * | 10/2001 | Nashimoto | 385/129 |
| 2004/0017962 A1 | * | 1/2004 | Lee et al. | 385/14 |

* cited by examiner

*Primary Examiner*—Frank G. Font
*Assistant Examiner*—Ryan Lepisto
(74) *Attorney, Agent, or Firm*—Lisa K. Jorgenson; Graybeal Jackson Haley LLP; Paul F. Rusyn

(57) ABSTRACT

A method and system of forming vertical optical interconnects in optical integrated circuits is disclosed. The method includes forming a first optical transmission layer over a substrate. A first cladding layer is then formed on the first optical transmission layer and portions of the first cladding layer removed to form an angled sidewall in the first cladding layer. An optical interconnect layer is formed on the angled sidewall of the first cladding layer and on an exposed portion of the first optical transmission layer.

13 Claims, 9 Drawing Sheets

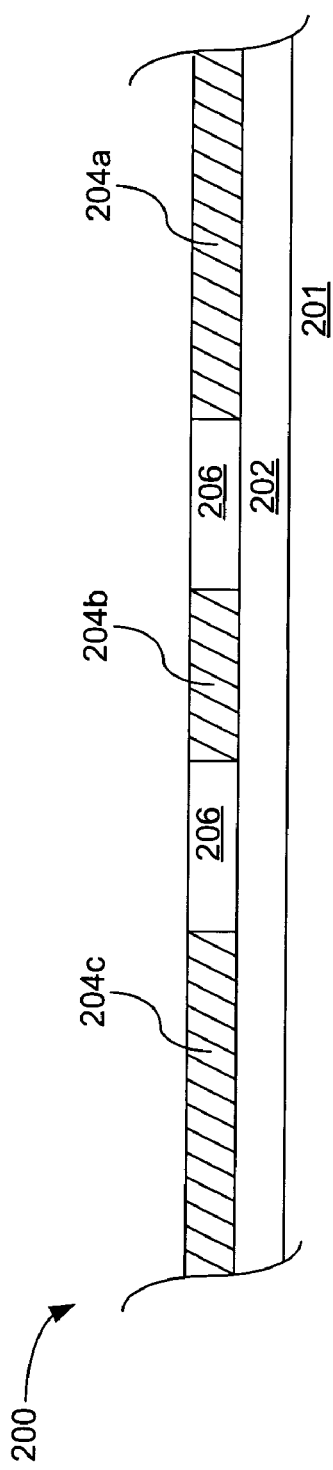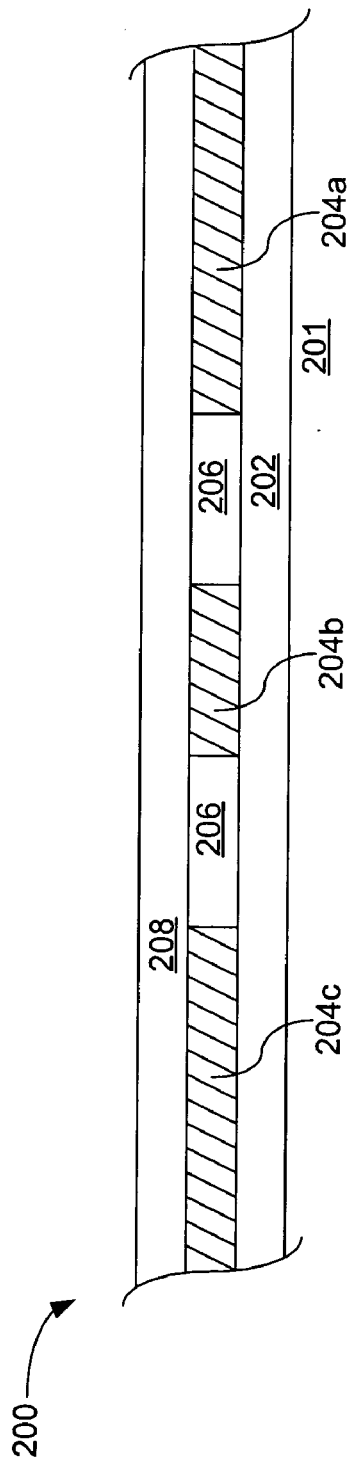

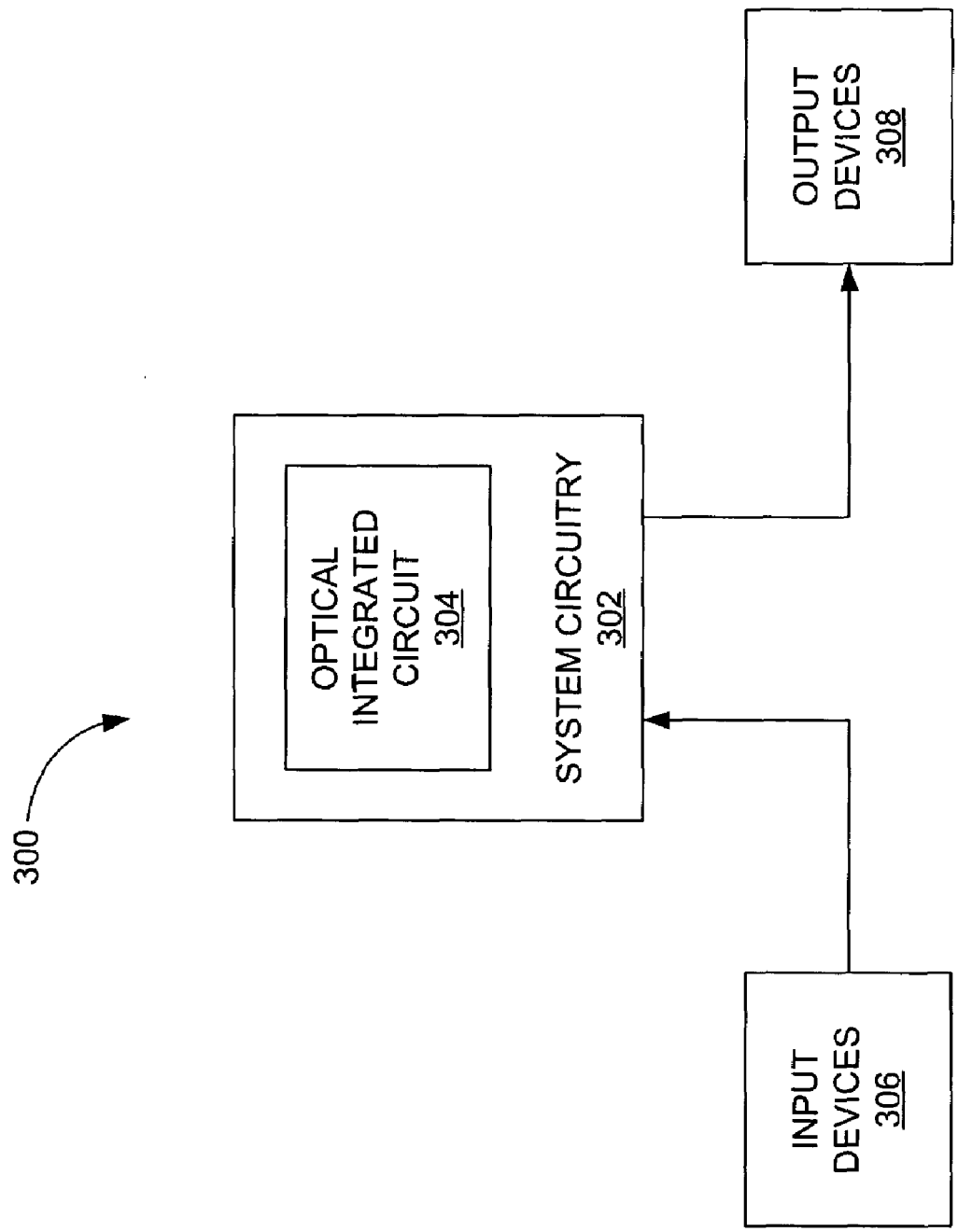

METHOD OF FORMING INTERLAYER CONNECTIONS IN INTEGRATED OPTICAL CIRCUITS, AND DEVICES FORMED USING SAME

TECHNICAL FIELD

The present invention relates generally to integrated photonic or optical circuits, and more specifically to forming interlayer connections in such circuits.

BACKGROUND OF THE INVENTION

Optical or photonic devices are becoming increasingly prevalent in many areas of technology today. For example, many communications systems include fiber optic cables and associated optical components for transmitting and receiving optical signals over the cables. Such optical systems provide very high data transfer rates and thus allow large amounts of data to be transferred very quickly, as will be appreciated by those skilled in the art.

In modern optical systems, optical components are integrated on a single substrate to thereby form compact, multifunctional, optical integrated circuits. These optical integrated circuits are analogous to electronic integrated circuits in which electronic components are formed and interconnected on a substrate to perform a desired function. In electronic integrated circuits, multiple layers are formed on the substrate and electronic components and required interconnections among such components are formed in these layers. The use of multiple layers allows more components to be formed on a single substrate, and also allows for easier and more efficient interconnection of such components.

Ideally, optical integrated circuits would also utilize multiple layers for the same reasons as electronic integrated circuits, namely to allow the formation of more optical components and easier and more efficient interconnection of the optical components. With optical integrated circuits, however, a unique problem is encountered that is different than electronic integrated circuits. When multiple layers are used, each layer must at selected points be coupled to one or more of the other layers to properly interconnect all the components formed in the layers. This is accomplished in a simple manner in electronic integrated circuits, as illustrated in FIG. 1 which shows a cross-sectional view of a portion of a conventional electronic integrated circuit 100 in which a via or electrical interconnect 102 electrically couples a first layer 104 to a second layer 106 formed on a substrate 108. In an electronic integrated circuit, the interconnect 102 is simply formed where required to interconnect the layers 104 and 106, which are conductive layers, and electrons flow between these layers through the interconnect.

In optical integrated circuits, waveguides are used in place of conductive layers and transfer optical energy or light between optical components. Unlike the electrons flowing in an electronic integrated circuit, light propagating through a layer cannot simply make a 90 degree turn and then propagate through an adjacent layer. For example, if the layers 102–106 in FIG. 1 correspond to waveguide layers in an optical integrated circuit, then light propagating through the layer 104 will not make a 90 degree turn and thereafter propagate through the interconnect 102 and into the layer 106. In fact, light propagating through the layer 104 would be confined to this layer and would not enter the interconnect 102 at all, as will be appreciated by those skilled in the art.

As a result of the problems associated with interconnecting multiple layers in optical integrated circuits, currently such circuits are limited to a single layer. This increases the cost and size of the circuits while limiting their functionality. The formation of "micro mirrors" to direct light from one layer to another has been proposed, but such an approach complicates the manufacture of the optical integrated circuit, which affects the cost and reliability of the circuit.

There is a need in optical integrated circuits to interconnect multiple layers so that light can propagate from one layer to another and thereby allow multilayer optical integrated circuits to be formed.

SUMMARY OF THE INVENTION

According to one aspect of the present invention, a method of optically interconnecting layers in an optical integrated circuit having a substrate includes forming a first optical transmission layer over the substrate. A first cladding layer is formed on the first optical transmission layer and portions of the first cladding layer removed to form an angled sidewall in the first cladding layer. An optical interconnect layer is then formed on the angled sidewall of the first cladding layer and on an exposed portion of the first optical transmission layer.

BRIEF DESCRIPTION OF THE DRAWINGS

FIGS. 2A–2F are cross-sectional views illustrating the formation of an optical interconnect according to one embodiment of the present invention.

FIG. 3 is a functional block diagram illustrating an optical integrated circuit including optical interconnects as shown in FIGS. 2F and/or 2I contained in an electronic or photonic system according to one embodiment of the present invention.

DETAILED DESCRIPTION OF THE INVENTION

FIGS. 2A–F are cross-sectional views illustrating the formation of an optical interconnect (see FIG. 2F) for a multilayer optical integrated circuit 200 according to one embodiment of the present invention. The formation of the optical interconnect through the process illustrated in these figures may be done using conventional deposition, photolithography, etching, and chemical mechanical planarization (CMP) techniques. As a result, multilayer optical integrated circuits 200 may be fabricated in a cost effective and reliable manner, as will be explained in more detail below.

In the following description, certain details are set forth in conjunction with the described embodiments of the present invention to provide a sufficient understanding of the invention. One skilled in the art will appreciate, however, that the invention may be practiced without these particular details. Furthermore, one skilled in the art will appreciate that the example embodiments described below do not limit the scope of the present invention, and will also understand that various modifications, equivalents, and combinations of the disclosed embodiments are within the scope of the present invention. Finally, the operation of well known operations has not been shown or described in detail below to avoid unnecessarily obscuring the present invention.

Figure 1:
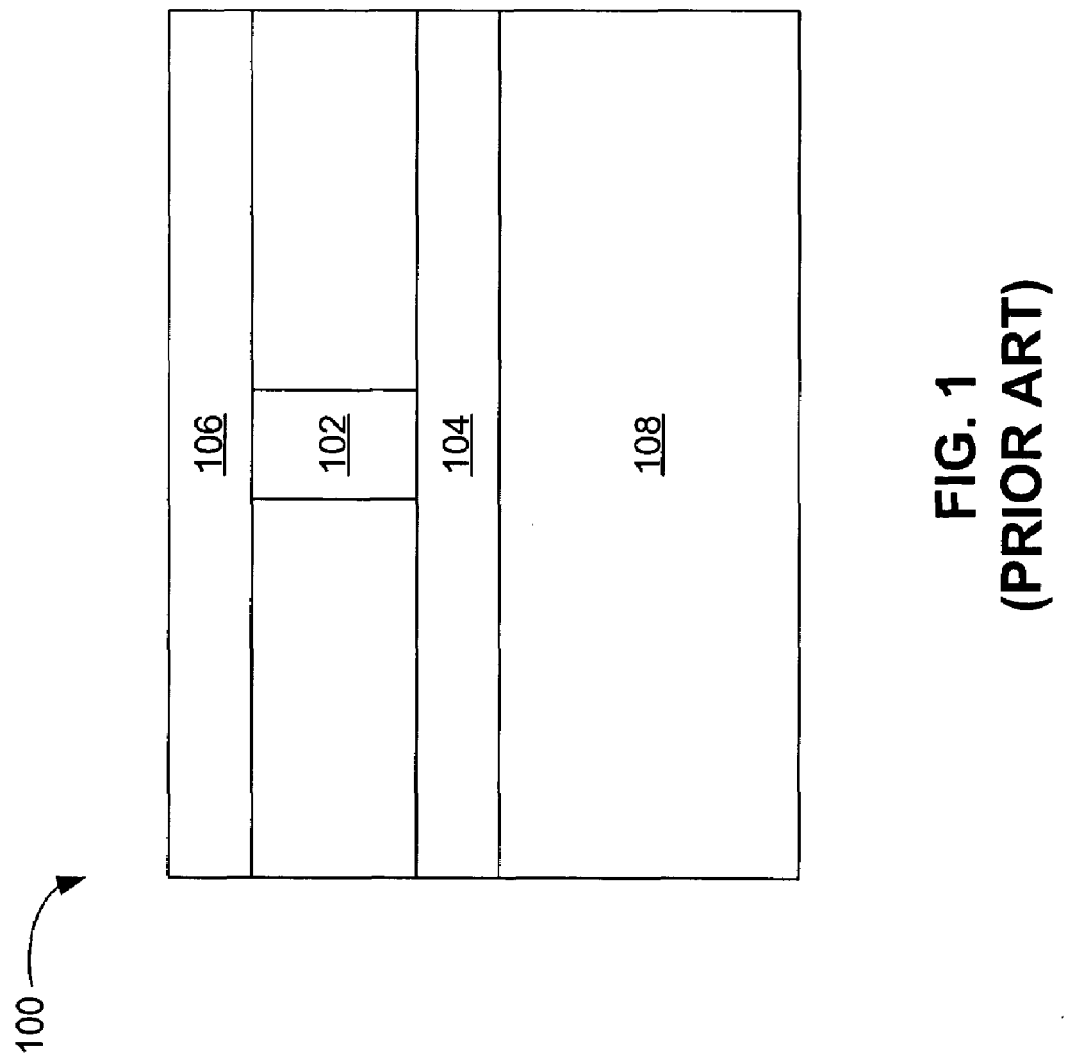
FIG. 1 is a cross-sectional view of a portion of a conventional electronic integrated circuit showing a via or electrical interconnection that electrically couples one layer to another in the integrated circuit.
Figure 2A:
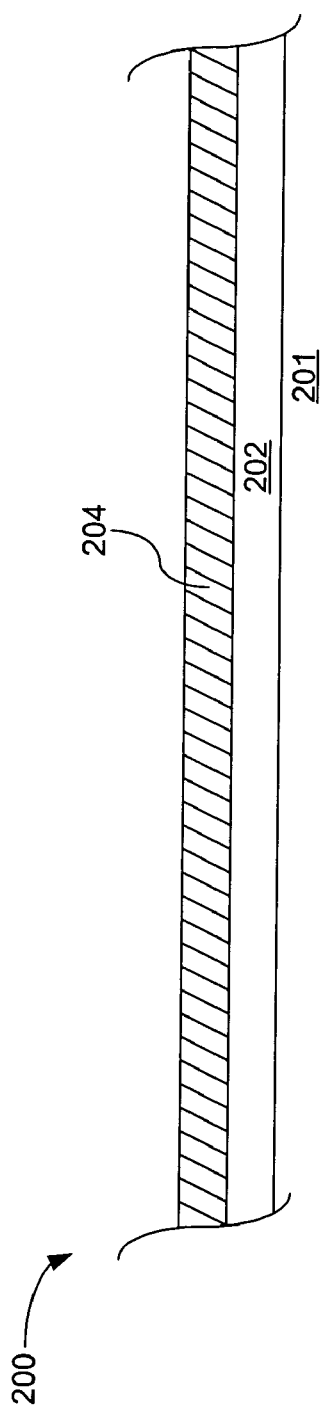

FIG. 2A illustrates the optical integrated circuit 200 including a substrate 201 on which a suitable lower dielectric layer 202 is formed. The substrate 201 may be silicon or other suitable material, and the lower dielectric layer 202 may be a layer of silicon dioxide $SiO_2$ formed on the silicon substrate. An optical transmission layer 204 is formed on the lower dielectric layer 202 from any dielectric material suitable for the transmission of light, such as silicon oxynitride SiON. The optical transmission layer 204 corresponds to a first "active" layer of the optical integrated circuit 200, and initially the layer is processed to form desired optical components in the layer, including active devices and waveguide interconnecting such devices.

Figure 2B:
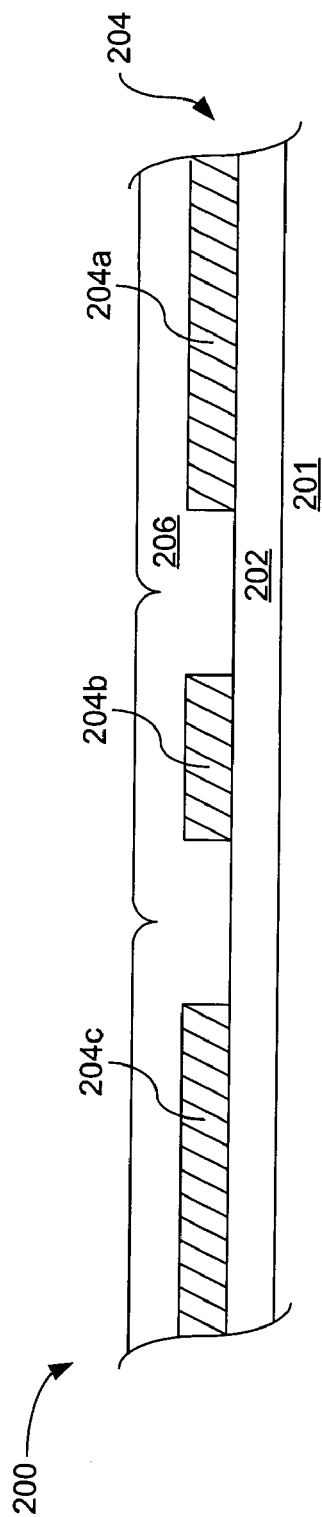

FIG. 2B illustrates an example of the optical transmission layer 204 after processing, with the layer now including three separate layers 204a–c. A first dielectric layer 206 formed from a suitable dielectric material, such as silicon dioxide $SiO_2$, is then formed on the optical transmission layers 204a–c. A variety of suitable dielectric materials may be utilized for the layer 206, and the layer may be formed through a variety of different techniques, such as being deposited through a suitable high-density plasma process so that the layer completely fills openings between the optical transmission layers 204a–c as shown in FIG. 2B.

Referring now to FIG. 2C, the deposited dielectric layer 206 is then chemically mechanically polished to remove portions of the layer above the optical transmission layers 204a–c and to planarize the optical transmission layers and the remaining portions of the dielectric layer between the optical transmission layers. A first cladding layer 208 formed from a suitable dielectric material, such as silicon dioxide $SiO_2$, is formed on the optical transmission layers 204a–c and remaining portions of the dielectric layer 206 as shown in FIG. 2D. The first cladding layer 208 will have a substantially planar surface since the layers 206, 204a–c on which the cladding layer is formed were planarized in the previous step of the process. A variety of suitable dielectric materials may be utilized for the first cladding layer 208 so long as an index of refraction $n_1$ of the optical transmission layers 204a–c is greater than an index of refraction $n_2$ of the cladding layer, as will be understood by those skilled in the art. The first dielectric layer 206 also has an index of refraction that is different than the index of refraction $n_1$ of the optical transmission layers 204a–c, and would typically be the same as the index of refraction $n_2$ of the first cladding layer 208.

Figure 2E:
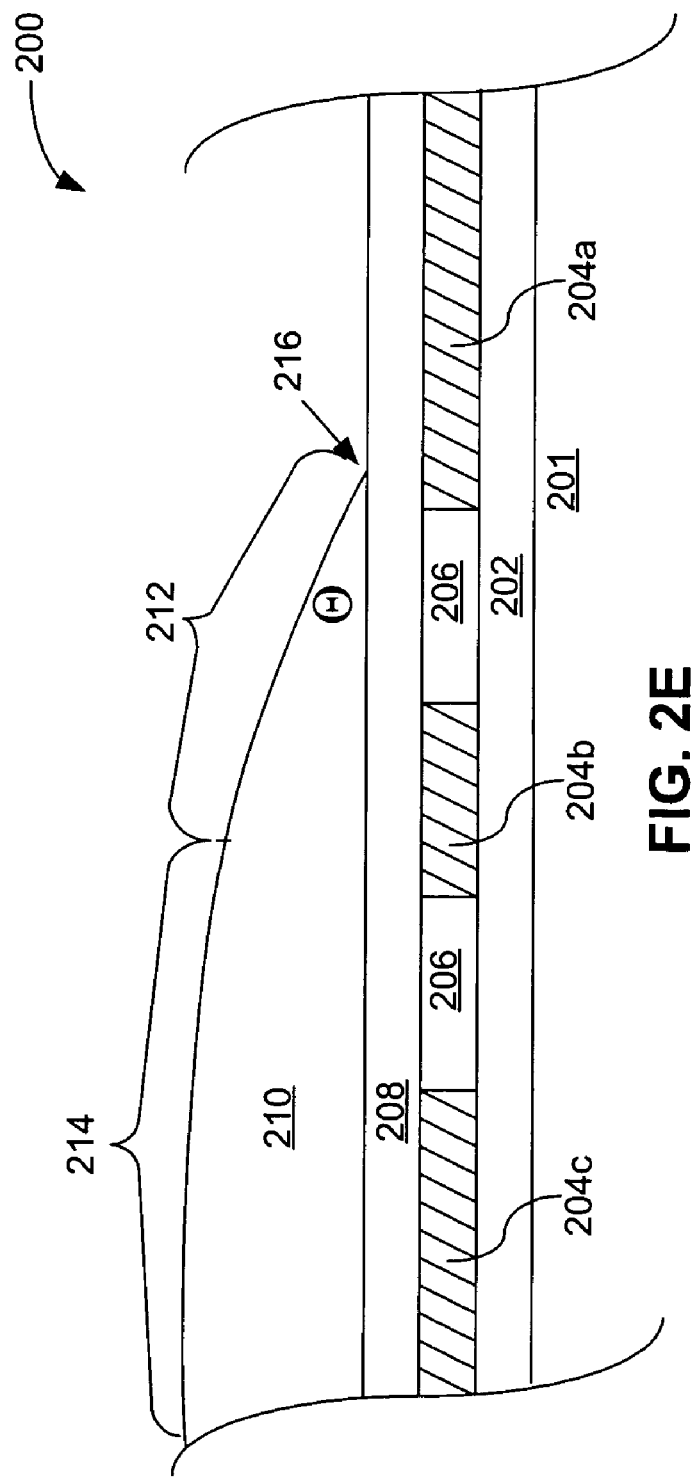

FIG. 2E illustrates mesa structures 210 which are then formed on the first cladding layer 208 at desired locations above the optical transmission layers 204a–c. The mesa structures 210 are so named because of the physical shape of the structures, with each mesa structure having an angled sidewall 212 and a planar upper portion 214. The mesa structures 210 are positioned above the optical transmission layers 204a–c so that a base 216 of the angled sidewall 212 overlaps a one of the optical transmission layers 204a–c to which an optical interconnect is to be coupled. In the example of FIG. 2E, the optical transmission layer 204a is the layer to which an optical interconnect will be coupled, will be described in more detail below. The optical transmission layers 204b,c would be coupled to optical interconnects in the same way as optical transmission layer 204a, and thus will not be described in more detail below.

To form the mesa structures 210, regions of photoresist (not shown) are patterned on the first cladding layer 208 where the mesa structures are to be located. These photoresist regions initially have substantially vertical sidewalls and are then reflowed to form the mesa structures 210 having the angled sidewalls 212. In other words, the photoresist regions are formed and then heated, causing the regions to melt slightly and thereby form the mesa structures 210. The photoresist regions can be formed slightly out of focus to adjust the angle of the resulting sidewalls 212 formed during reflow of the regions. In one embodiment, the photoresist regions are reflowed at a temperature between 140° C. and 160° C. The angled sidewalls 212 of the mesa structure 210 must have a required angle θ, where θ is the angle defined between the sidewall 212 and the upper surface of the first cladding layer 208 as shown in FIG. 2E. The required value for the angle θ will be discussed in more detail below.

Figure 2F:
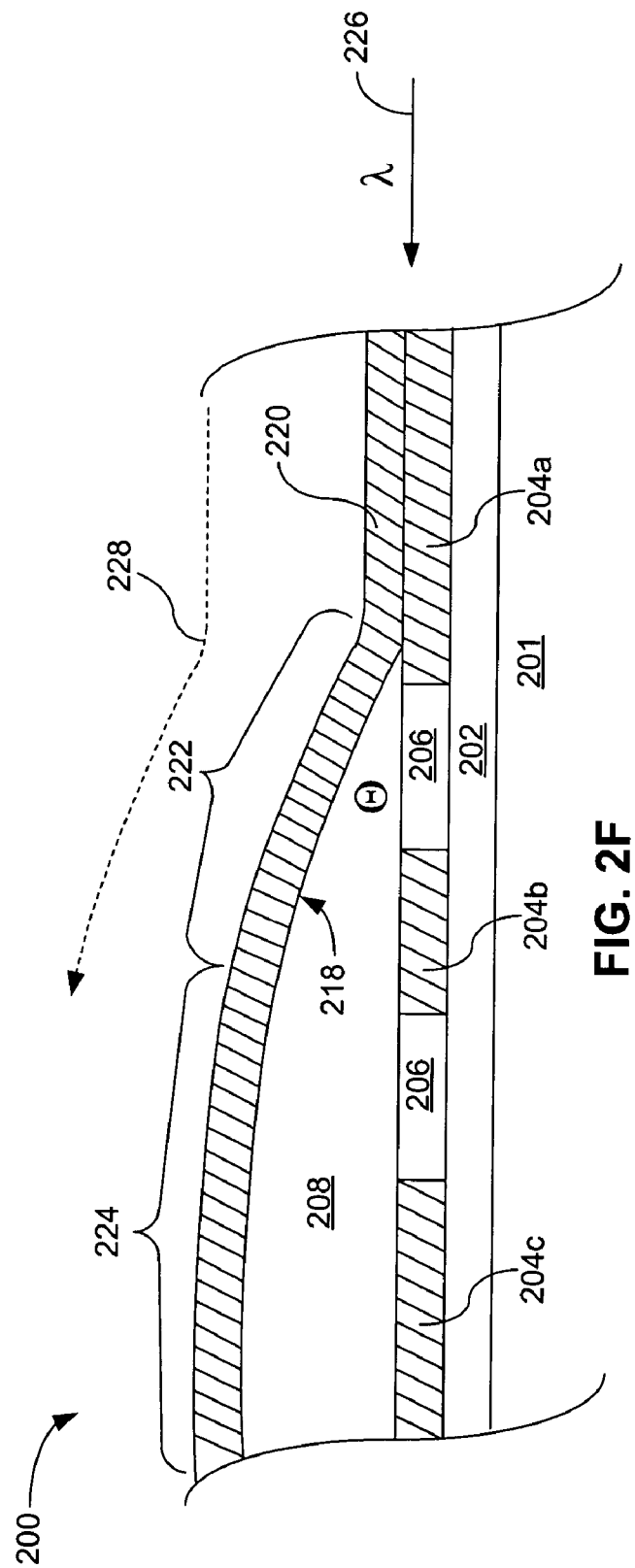

Referring now to FIG. 2F, the mesa structure 210 and exposed portions of the first cladding layer 208 are then removed, such as through a dry etch process, at the same rate to form an angled sidewall 218 in the first cladding layer 208 and expose the lower optical transmission layer 204a. By removing the mesa structure 210 and exposed portions of the first cladding layer 208 at the same rate, the angled sidewall 218 in the first cladding layer 208 has approximately the same angle θ as the sidewall 212 of the mesa structure. A second optical transmission layer 220 is then formed on the lower optical transmission layer 204a and on the first cladding layer 208 including the angled sidewall 218. The second optical transmission layer 220 is formed from a suitable dielectric material having the same index of refraction as the lower optical transmission layer 204a. Thus, when the lower optical transmission layer 204a is silicon oxynitride SiON, the second optical transmission layer 220 will also be a silicon oxynitride layer having the same index of refraction. The first and second optical layers 204a, 220 have the same index of refraction so that the layers collectively form a waveguide, with light having a wavelength λ propagating through both layers from right to left as indicated by an arrow 226 in the example of FIG. 2E.

An angled portion of the second optical transmission layer 220 forms a vertical optical interconnect 222 that couples the lower optical transmission layer 204a to an upper optical transmission layer 224. Thus, at this point a multilayer optical integrated circuit 200 has been formed, with optical components (not shown) coupled to the lower optical transmission layer 204a being coupled through the vertical optical interconnect 222 to the upper optical transmission layer 224 and optical components (not shown) coupled to the upper optical transmission layer. The optical components coupled to the upper optical transmission layer 224 would typically be formed during formation of the second optical transmission layer 220.

In operation, light having the wavelength λ propagates through the layers 204a, 220 and then through the vertical optical interconnect 222 and into the layer 224, as illustrated by a dotted line arrow 228 in FIG. 2F. The light is confined to the optical interconnect 222 through total internal reflection so long as the angle θ of the optical interconnect is less than a specified angle. This ensures light propagating through the layers 204a, 220 will enter the vertical optical interconnect 222 at an angle that is less than a critical angle to ensure total internal reflection within the optical interconnect, as will be understood by those skilled in the art. Moreover, the angle θ also ensures the light is confined through total internal reflection when propagating from the vertical optical interconnect 222 into the upper optical transmission layer 224, as will also be appreciated by those skilled in the art. In one embodiment, where the layers 204a, 220 are silicon oxynitride SiON and the cladding layer 208 is silicon dioxide $SiO_2$, the angle $\theta$ of the optical interconnect must be less than 50 degrees.

Figure 2G:
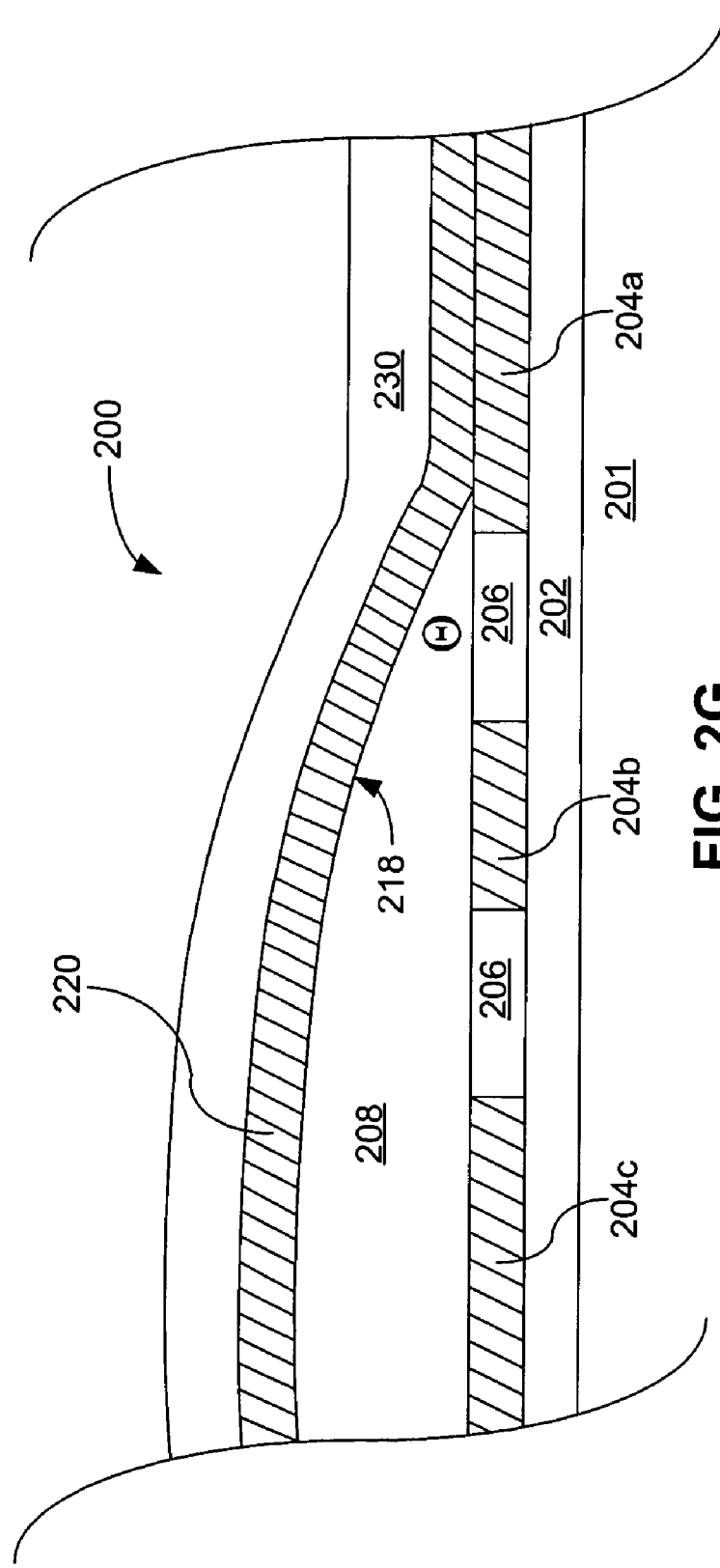
FIGS. 2G–I are cross-sectional views and FIGS. 2J–K are top views illustrating the formation of an optical interconnect according to another embodiment of the present invention.

FIGS. 2G–2K are cross-sectional views illustrating the formation of an optical interconnect according to another embodiment of the present invention. In this embodiment, instead of forming optical components in the upper optical transmission layer 224 during formation of this layer, a second cladding layer 230 is formed on the second optical transmission layer 220 as shown in FIG. 2G. The second cladding layer 230 is also formed from a suitable dielectric material, such as silicon dioxide $SiO_2$, having the same index of refraction as the first cladding layer 208.

Figure 2H:
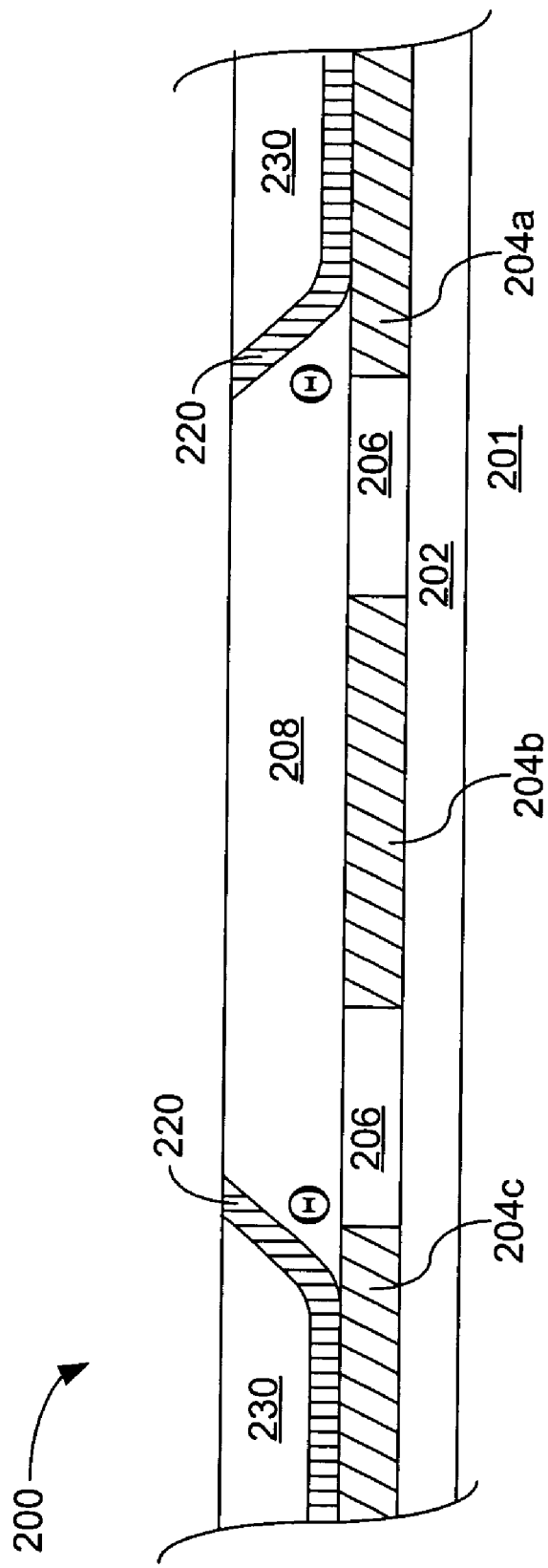

After formation of the second cladding layer 230, a non-selective chemical mechanical planarization process is performed, with the process removing the second cladding layer 230 at the same rate as the second optical transmission layer 220. FIG. 2H illustrates the integrated circuit 200 after the non-selective chemical mechanical planarization process has been completed. Because the process removes the second cladding layer 230 and second optical transmission layer 220 at the same rate, the upper surface of the integrated circuit 200 is planarized, with only the lower portions of the second optical transmission layer under the second cladding layer and the angled sidewall portions of the second optical transmission layer remaining. Notice that in FIG. 2H, an optical interconnect coupled to the lower optical transmission layer 204c is shown in addition to an optical interconnect coupled to the lower optical transmission layer 204a.

Figure 2I:
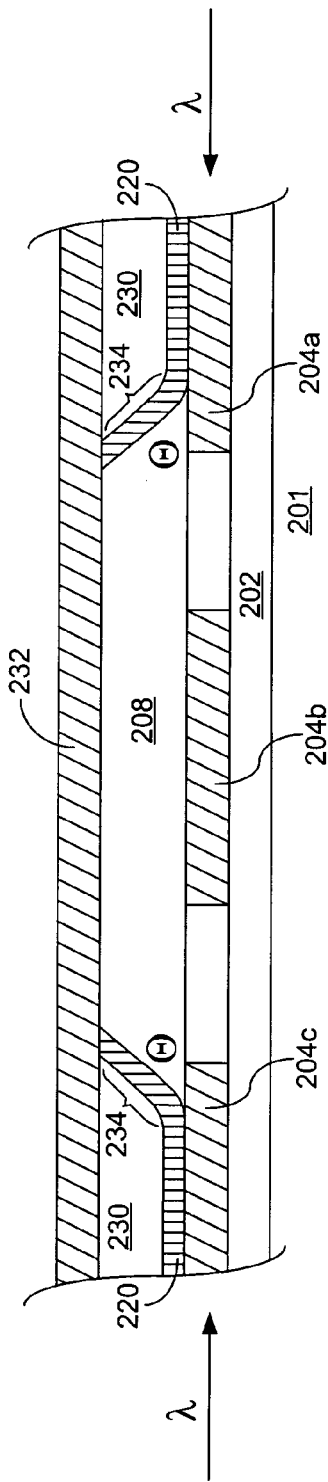

At this point, an upper optical transmission layer 232 is formed on the planarized surface from a suitable dielectric material, such as silicon oxynitride SiON, as shown in FIG. 2I. The material used for the upper optical transmission layer 232 is determined by the materials used for the optical transmission layers 204, 220, with the upper optical transmission layer being formed from the same material and having the same index of refraction as the layers 204, 220. In this way, the waveguide collectively formed by the layers 204a, 220 is coupled through a vertical optical interconnect 234 to the upper optical transmission layer 232. In operation, light having a wavelength $\lambda$ propagates through the layers 204a, 220 from right to left in FIG. 2I and then through the corresponding vertical optical interconnect 234 and into the layer 232. Similarly, light having a wavelength $\lambda$ propagates through the layers 204c, 220 from left to right and then through the corresponding vertical optical interconnect 234 and into the layer 232.

Figure 2J:
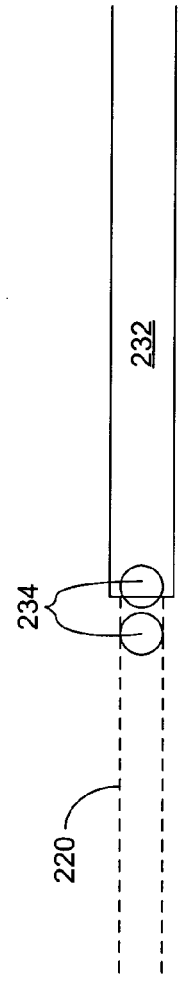
Figure 2K:
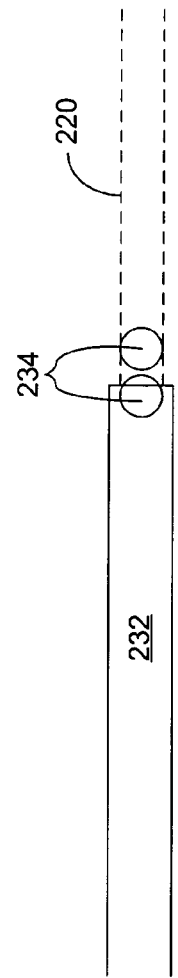

Although from FIG. 2I it appears that the upper optical transmission layer 232 couples together the waveguide formed by layers 204c, 220 on the left to the waveguide formed by the layers 204a, 220 on the right, each waveguide is actually coupled to separate segments of the upper optical transmission layer as shown in FIGS. 2J and 2K. FIG. 2J is a top view illustrating the coupling of the left waveguide including layers 204c, 220 through the corresponding vertical optical interconnect 234 to a first segment of the upper optical transmission layer 232. Similarly, FIG. 2K is a top view illustrating the coupling of the right waveguide including layers 204a, 220 through the corresponding vertical optical interconnect 234 to a separate segment of the upper optical transmission layer 232. The layers 220 in FIGS. 2J and 2K are shown with dotted lines since these layers are on a lower layer of the integrated circuit 200 in the top views depicted in these figures. When the upper optical transmission layer 232 is formed, the layer is patterned as required to make connections to the required underlying vertical optical interconnects 234. The process illustrated in FIGS. 2A–2I may be repeated to form additional layers in the optical integrated circuit 200 over the upper optical transmission layer 232, as will be appreciated by those skilled in the art.

In one embodiment, the substrate is silicon, optical transmission layers 204, 220, and 232 are silicon oxynitride SiON, and layers 206, 208 and 230 are silicon dioxide $SiO_2$. In another embodiment, the thickness of the layer 206 is approximately 10,000 angstroms, layer 208 is approximately 5,000 angstroms, layer 230 is approximately 8,000 angstroms, and lower dielectric layer 202 is approximately 30,000 angstroms.

FIG. 3 is a block diagram of an electronic or optical system 300 including system circuitry 302 containing an optical integrated circuit 304 including the optical interconnects 222 of FIG. 2F and/or the optical interconnects 234 of FIG. 2I. The system circuitry 302 includes circuitry for performing required functions, such as communicating data over an optical network (not shown) using the optical integrated circuit 304. One or more input devices 306, such as a keyboard, may also be included in the system 300 to allow a user to input data. The system 300 may also include one or more output devices 308, such as a video display, to provide data to the user.

Even though various embodiments and advantages of the present invention have been set forth in the foregoing description, the above disclosure is illustrative only, and changes may be made in detail and yet remain within the broad principles of the present invention. Therefore, the present invention is to be limited only by the appended claims.

The invention claimed is:

1. A method of optically interconnecting layers in an optical integrated circuit including a substrate, the method comprising:
    forming a first optical transmission layer over the substrate;
    forming a first cladding layer on the first optical transmission layer;
    removing portions of the first cladding layer to form an angled sidewall in the first cladding layer;
    forming an optical interconnect layer on the angled sidewall of the first cladding layer and on an exposed portion of the first optical transmission layer; and
    wherein removing portions of the cladding layer to form an angled sidewall comprises:
        forming mesa structures on the cladding layer at desired locations; and
        removing the mesa structures and exposed portions of the cladding layer to form the angled sidewall in the cladding layer.

2. The method of claim 1 wherein the first optical transmission layer and the optical interconnect layer each comprise silicon oxynitride.

3. The method of claim 1 wherein the cladding layer comprises silicon dioxide.

4. The method of claim 1 wherein the angled sidewall of the first cladding layer has an angle of less than 50 degrees.

5. The method of claim 1 wherein forming mesa structures comprises:
    patterning the cladding layer with photoresist; and
    reflowing the photoresist to create the mesa structures.

6. The method of claim 1 further comprising:
    forming a second cladding layer on the optical interconnect layer;

removing portions of the second cladding layer to expose a portion of the optical interconnect layer that is formed on the angled sidewall of the first cladding layer; and forming a second optical transmission layer on the second cladding layer and on the exposed portion of the optical interconnect layer.

7. The method of claim 6 wherein forming a second optical transmission layer includes forming desired optical components in the second optical transmission layer.

8. The method of claim 1 wherein removing portions of the first cladding layer to form an angled sidewall in the first cladding layer includes removing portions of the cladding layer to form the exposed portion of the first optical transmission layer.

9. A method of optically interconnecting layers in an optical integrated circuit including a substrate, the method comprising:

forming a first optical transmission layer over the substrate;

removing portions of the first optical transmission layer to form respective active regions of the first optical transmission layer, with void regions being defined between the active regions;

forming a first dielectric layer in the void regions and on the active regions of the first optical transmission layer;

removing portions of the first dielectric layer to planarize upper surfaces of the layer in the void regions and upper surfaces of the active regions of the first optical transmission layer;

forming a first cladding layer on the planarized upper surfaces of the void regions and active regions of the first optical transmission layer;

forming mesa structures on the first cladding layer;

removing the mesa structures and portions of the first cladding layer to form angled sidewalls in the first cladding layer on respective active regions of the first optical transmission layer;

forming a second optical transmission layer on the angled sidewalls in the first cladding layer and on respective active regions for each sidewall.

10. The method of claim 9 further comprising;

forming a second cladding layer on the second optical transmission layer;

removing portions of the second cladding layer and the second optical transmission layer to form vertical optical interconnects corresponding to the portions of the second optical transmission layer formed on the sidewalls of the mesa structures, the vertical optical interconnects having ends exposed on an upper planar surface; and forming a third optical transmission layer on the upper planar surface and on ends of the vertical optical interconnects.

11. The method of claim 10 wherein removing portions of the second cladding layer and the second optical transmission layer includes removing portions of the first cladding layer in forming the upper planar surface.

12. The method of claim 10 wherein the first dielectric layer and the cladding layers comprise silicon dioxide, and wherein the first, second, and third optical transmission layers comprise silicon oxynitride having the same indices of refraction.

13. The method of claim 12 wherein the angled sidewalls in the first cladding layer have angles of less than 50 degrees.

* * * * *